United States Patent [19]
Busby et al.

[11] 3,751,049
[45] Aug. 7, 1973

[54] SEAL RING AND METHOD OF MAKING

[75] Inventors: Donald W. Busby, Durango, Colo.; Robert D. Goodfellow, Jr., Bedford, Pa.

[73] Assignee: Subterranean Tools Inc., Beaumont, Tex.

[22] Filed: Feb. 25, 1971

[21] Appl. No.: 118,709

[52] U.S. Cl. .................. 277/235 A, 277/92, 277/85
[51] Int. Cl. ............................................. B65d 53/00
[58] Field of Search ........................ 277/223, 4, 235, 277/92, 83, DIG. 6

[56] References Cited
UNITED STATES PATENTS

| | | | |
|---|---|---|---|
| 2,837,359 | 6/1958 | Corsi | 277/235 X |
| 3,104,883 | 9/1963 | English et al. | 277/235 X |
| 3,162,456 | 12/1964 | Williams | 277/235 X |
| 3,180,650 | 4/1965 | Liebig | 277/224 X |
| 3,372,940 | 3/1968 | Keller | 277/235 X |
| 3,415,556 | 12/1968 | Dryden | 277/235 X |
| 3,472,519 | 10/1969 | Gehret | 277/235 X |

*Primary Examiner*—Meyer Perlin
*Assistant Examiner*—Ronald C. Capossela
*Attorney*—Melvin A. Crosby

[57] ABSTRACT

The specification discloses a seal ring, specifically, a dynamic seal ring consisting of a ring of metal having an annular radial sealing face on one end thereof on which is fused a nonmetallic coating, such as a ceramic material and which coating is finished smooth and polished.

4 Claims, 3 Drawing Figures

PATENTED AUG 7 1973 3,751,049

INVENTORS
DONALD BUSBY
ROBERT GOODFELLOW
BY
Melvin A. Crosby

SEAL RING AND METHOD OF MAKING

The present invention relates to seal rings, and especially to dynamic seal rings.

Seal rings are well known, and in respect of dynamic seal rings, the seal ring is provided for sealing against a surface which moves relatively to the seal ring. A dynamic seal ring thus has a running or sliding fit with the surface which it is to seal. In some instances, where such a seal ring merely has to contain lubricant or some other liquid or a gas, metals can be run directly together as, for example, steel and bronze, or a nonmetallic material such as graphite engaging steel can be employed.

In other instances, where the seal ring must seal against the ingress of foreign material, such as abrasive particles into the sealed off space, the material of the seal ring must be of such a nature as to be able to withstand the abrading action of such foreign material.

The present invention is particularly concerned with a dynamic seal ring for sealing a region against the ingress of abrasive particles into the sealed off space and against the loss of lubricant from the sealed off space.

A particular object of the present invention is the provision of a seal ring of the nature referred to which will have long life even in the presence of abrasive particles of foreign material.

Another object of the present invention is the provision of a seal ring of the nature referred to which is adapted for running against a hardened steel meeting surface, but which will not be worn down thereby.

Still another object of the present invention is the provision of a seal ring having an extremely hard sealing surface for running engagement with a hard steel surface and which will not gall or seize on the steel surface.

Still another object of this invention is the provision of a seal ring having a hard nonmetallic sealing surface thereon which is relatively inexpensive to manufacture, but which has long life.

The exact nature of the present invention will become more apparent upon reference to the detailed specification taken in connection with the accompanying drawings in which.

BRIEF SUMMARY OF THE INVENTION

The seal ring according to the present invention comprises a metal ring having a sealing face on one end thereof with a layer of nonmetallic material, preferably ceramic, on the sealing face and finished to a smooth flat surface.

The metal ring is preferably stainless steel and is forged and rough turned prior to the application of the ceramic layer on the sealing face thereof and, thereafter, the exposed metal of the sealing ring is finished smooth, and the exposed surface of the ceramic material is finished to an extremely smooth, flat surface and is polished.

DETAILED DESCRIPTION

Figure 1:
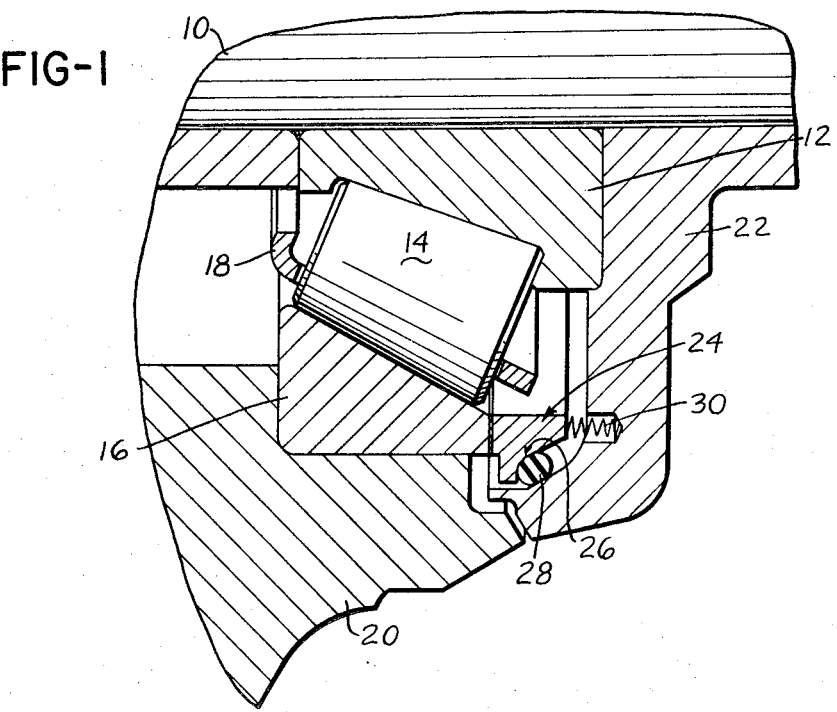
FIG. 1 is a fragmentary sectional view showing a device having a bearing therein with a seal according to the present invention sealing the bearing.

Referring to the drawings somewhat more in detail, in FIG. 1, reference numeral 10 indicates a nonrotatable support member such as a support shaft. Mounted on support member 10 is the inner race 12 of an anti-friction bearing, for example, a roller bearing which also comprises rolls 14 and an outer race 16. Bearing cage 18 is included in the bearing structure.

Mounted on outer race 16 is a rotatable member 20 which may comprise the rotary part of a mining cutter of the nature disclosed in U.S. Pat. No. 3,216,513, for example.

Also mounted on stationary member 10 is an end cap 22 fixedly secured to member 10 in any suitable manner.

Contained within cap 22 is the annular seal ring 24 according to the present invention which engages one end face of outer race 16 so as to seal against foreign matter getting into the bearing.

Cutters according to the present invention are used in locations where dust and grit is produced in large amounts, and if the bearing is not carefully and efficiently sealed, the highly abrasive dust and grit can get into the bearing and cause rapid wear and failure thereof. Further, the bearings in a cutter arrangement of the nature referred to are extremely heavily loaded, and it is essential that they be kept as free of foreign matter as possible.

Further, by efficiently sealing the bearing, lubricant can be retained inside member 20 and thereby keep the anti-friction bearing adequately lubricated. In the usual cutter arrangement, only a fragment of which is shown in FIG. 1, there are two anti-friction bearings in spaced relation, one in each end of the rotary cutter element 20 so as to hold the element 30 firmly against radial or axial movement relative to the stationary supporting member 10.

Seal ring 24 preferably has a recess 26 on the side facing away from bearing race 16 adapted for receiving a resilient annular "O" ring 28 by means of which seal ring 24 is sealed to end cap 22 and also urged axially toward bearing race 16 which the seal ring sealingly engages. Optionally, a series of compression springs 30 can be distributed peripherally about sealing ring 24 and bear between the sealing ring in end cap 22 for urging the sealing ring toward bearing race 16.

Figure 2:
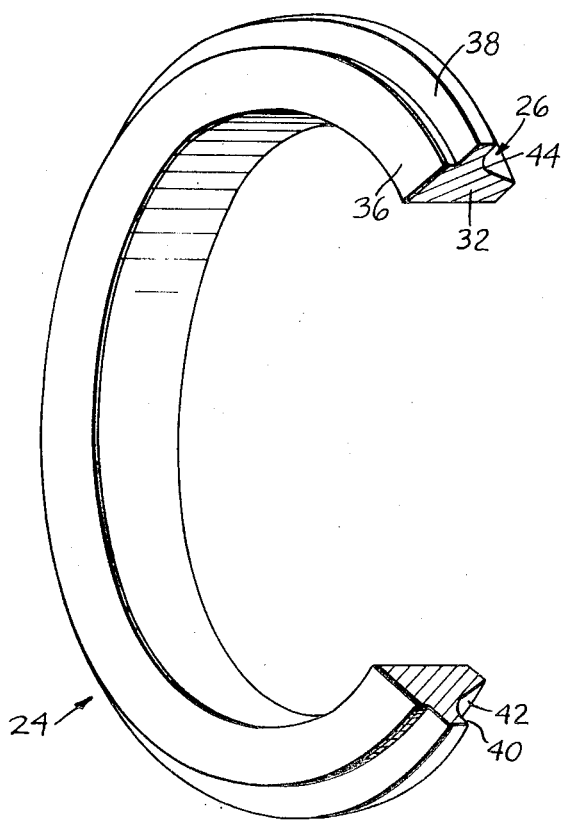
FIG. 2 is a perspective view, partly in section, showing the seal ring according to the present invention.
Figure 3:
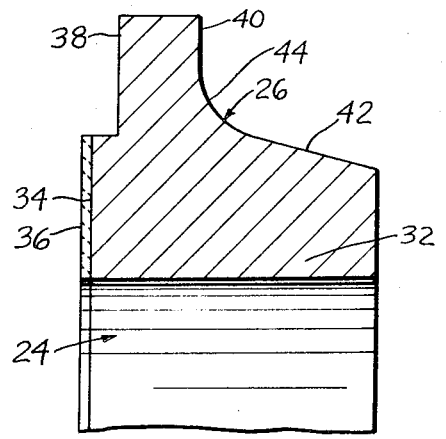
FIG. 3 is a cross sectional view through one side of the ring drawn to enlarged scale and showing details thereof.

As will be seen in FIGS. 2 and 3, sealing ring 24 comprises a metal ring part 32, preferably stainless steel, and provided with a flat annular face 34 on the side facing bearing race 16. Surface 34, according to the present invention, is provided with a nonmetallic coating 36 with ceramic being preferred for this coating material. Spaced axially from the bearing race end of the sealing ring is a radially outwardly projecting portion 38 which, on the side facing away from the bearing race end of the sealing ring, presents a shoulder 40 which forms a part of the surface of the aforementioned recess 26.

The ring 32 commencing at the end opposite the bearing race end thereof is provided with a peripheral surface 42 tapering outwardly at an included angle of about 30° and being joined to shoulder 40 by a curved concave region 44. The shoulder 40, the taper surface 42 and the concave region 44 together define the recess 26 in which resilient annular ring 28 is seated.

In making the seal ring according to the present invention, metal ring 32 is advantageously forged from stainless steel and is then rough turned. The ring is preferably sand blasted and heat treated after the rough turning. Thereafter, the layer of ceramic 36 is applied to the rough turned end face 34 of ring 32 and is fired in place.

After the ceramic coating is fired in place, the exposed metal of ring 32 is finish turned and the exposed face of ceramic coating 36 is finished so as to be smooth and flat in a plane perpendicular to the axis of ring 32. The exposed face of the ceramic coating 36 is preferably lapped flat to within about three height bands and is then polished so as to be extremely smooth. Such a surface will run in with the bearing race 16 and provide a highly efficient seal to exclude foreign matter from the bearing while retaining the lubricant therein.

Further, the ceramic material running on the hard steel of bearing race 16 will not gall but, instead, the interengaging surfaces of the bearing race and seal ring will wear into an extremely good fit that will not overheat at the relatively low operating speeds at which member 20 rotates relative to stationary member 10 and which will, as mentioned, provide an extremely efficient seal.

Modifications may be made within the scope of the appended claims.

What is claimed is:

1. In a dynamic seal ring; a rigid annular metal ring having at least one radially disposed planar face at one axial end thereof, and nonmetallic wear resistant material covering said axial face and bonded thereto, the axially exposed surface of said wear resistant material being finished to a smooth planar surface parallel to said planar face, said surface being adapted for sliding sealing engagement with a radially extending annular surface on a member coaxial with said ring and rotatable relative to the ring, said metal ring comprising a peripheral recess opening radially outwardly from the metal ring and also opening axially in a direction away from said one end of the metal ring and adapted to form a seat for receiving a resilient ring operable to support said metal ring on a support member and to urge said metal ring in a direction toward said one end thereof, said recess being formed by juxtaposed axial and radial portions of said metal ring, said axial portion comprising an outwardly facing peripheral region on said metal ring commencing at the end thereof opposite said one end thereof and extending generally axially of said metal ring in a direction toward said one end and terminating short of said one end of said metal ring, said radial portion comprising a radially outwardly extending region on said metal ring extending from said peripheral region to the outer periphery of said metal ring, said radial region forming a shoulder facing away from said one end of said metal ring and disposed at the end of said peripheral region which is nearest said one end of the metal ring.

2. A seal ring according to claim 1 in which said metal ring extends radially outwardly beyond the limits of said planar face in the axial region of said ring which is between said planar face and said radially outwardly extending region and on the side nearest said planar face is displaced axially from said planar face toward the other end of said metal ring.

3. A seal ring according to claim 2 in which said peripheral region tapers outwardly in a direction toward said radially outwardly extending region and the juncture of said peripheral region with said radially outwardly extending region is curved so as to be concave in the radially outward direction of said metal ring.

4. A seal ring according to claim 2 in which said wear material is ceramic.

* * * * *